(12) United States Patent
Ramirez Reid

(10) Patent No.: US 8,628,817 B2
(45) Date of Patent: Jan. 14, 2014

(54) PROCESS FOR PRODUCING ACIDULATED 50% CONCENTRATED SOLUTION AND DRY POWDER OF PEPTIDES FROM PROTEIN PRODUCTS AND WASTE OF ANIMAL, FISH AND AQUACULTURE ORIGIN

(75) Inventor: Rodrigo Ramirez Reid, Comuna de Recoleta (CL)

(73) Assignee: Ingeniera Ramfer Ltda, Santiago (CL)

( * ) Notice: Subject to any disclaimer, the term of this patent is extended or adjusted under 35 U.S.C. 154(b) by 5 days.

(21) Appl. No.: 13/055,307

(22) PCT Filed: Feb. 2, 2010

(86) PCT No.: PCT/IB2010/050440
§ 371 (c)(1),
(2), (4) Date: Jan. 21, 2011

(87) PCT Pub. No.: WO2010/089695
PCT Pub. Date: Aug. 12, 2010

(65) Prior Publication Data
US 2011/0129565 A1 Jun. 2, 2011

(30) Foreign Application Priority Data
Feb. 9, 2009 (CL) ..................................... 292-2009

(51) Int. Cl.
*A23J 1/00* (2006.01)

(52) U.S. Cl.
USPC ........................................................ 426/656

(58) Field of Classification Search
None
See application file for complete search history.

(56) References Cited

U.S. PATENT DOCUMENTS

| | | | |
|---|---|---|---|
| 2,953,456 A * | 9/1960 | Mohler et al. | ................... 426/46 |
| 5,053,234 A | 10/1991 | Anderson et al. | |
| 2004/0038391 A1 | 2/2004 | Pyntikov et al. | |
| 2005/0244567 A1 * | 11/2005 | Carlsson | ....................... 426/656 |

FOREIGN PATENT DOCUMENTS

| | | |
|---|---|---|
| CL | 30380 | 7/1977 |
| ES | 435733 | 7/1978 |
| ES | 465733 A1 * | 10/1978 |
| ES | 2 059 911 | 11/1994 |
| FR | 2 835 703 | 8/2003 |
| SU | 442800 A * | 5/1975 |
| WO | WO 88/05633 | 8/1988 |
| WO | WO 2006/096067 | 9/2006 |

* cited by examiner

*Primary Examiner* — Humera Sheikh
*Assistant Examiner* — Subbalakshmi Prakash
(74) *Attorney, Agent, or Firm* — Merchant & Gould P.C.

(57) ABSTRACT

The invention is directed to a process for the production of wet solutions of peptides concentrated to 50% or dry peptides, for human and animal consumption, using as raw material secondary products generated in the production of protein food for human consumption. The process is started with a low temperature fat extraction previous to enzymatic action, and the subsequent enzymatic hydrolysis of the low fat raw material is combined with acid hydrolysis, increasing the protein yield to nearly 100%, eliminating organic liquid industrial waste originating from products and residues of animal protein origin, fish and aquaculture.

6 Claims, No Drawings

PROCESS FOR PRODUCING ACIDULATED 50% CONCENTRATED SOLUTION AND DRY POWDER OF PEPTIDES FROM PROTEIN PRODUCTS AND WASTE OF ANIMAL, FISH AND AQUACULTURE ORIGIN

This application is a National Stage Application of PCT/IB2010/050440, filed 2 Feb. 2010, which claims benefit of Ser. No. 292-2009, filed 9 Feb. 2009 in Chile and which applications are incorporated herein by reference. To the extent appropriate, a claim of priority is made to each of the above disclosed applications.

FIELD OF THE INVENTION

The present invention is directed to a process for producing an acidulated 50% concentrated solution and dry powder of peptides, from protein products and waste of animal, fish, and aquaculture origin.

It is based primarily in the process of enzymatic and chemical hydrolysis of protein products, generated in the processes of food production for human consumption.

BACKGROUND OF THE INVENTION

The procedures used up to date, for example, in the industry for fish flour or other types of flour fabrication, for example Chilean Patent N° 30380 (Comittee of Technological Research from the Corporation for the promotion of production,) considers the manipulation of solid and semi-solid matter in part of its process and oils. Said process allows obtaining from 10 to 14% of fat with a significant loss in the texture of the final product, due to the limited control on the parameters of the process. Said process, as well as the state of the art, consists basically in shredding the fish waste to the size of particles, partial homogenization of the shredded matter and being subjected to cooking, centrifugation and decantation, obtaining water, wet solids and oil, for animal consumption.

In one hand, it is known the procedure of acid-basic hydrolysis contemplating subjecting the raw material to an acid-basic hydrolysis producing the separation of lipids, obtaining a concentration subjected to drying and afterwards, to milling and packing.

On the other hand, the enzymatic hydrolysis process subjects the raw material to an enzymatic hydrolysis, where lipids are separated, obtaining a concentration of the product which is subjected to drying for further milling and packing.

Document WO 2006/096067 (Wahl) of 14 Sep. 2006 discloses a method for the process of enzymatic hydrolysis of collagen and raw material containing proteins. The raw material suffers an enzymatic hydrolysis to produce three layers: a top layer containing fat, an intermediate layer comprising water-soluble components, and a bottom layer with non-soluble material, such as bones and non-soluble proteins. These layers are separated and the second layer is further processed for separation, by cooling during an appropriate time producing two layers: a bottom layer containing totally or partially the collagen, and a top layer of liquid containing the remaining water-soluble proteins. The last layer is withdrawn, and the other is heated until transformed in liquid. The facilities where this process is performed comprises an hydrolysis tank with a revolving agitation mechanism, and a heat exchange device; a reversible screw located at the bottom of the tank; a compensation collector for separation of collagen, including an inlet for the hydrolyzed supply; a heat exchange system comprising a heating jacket surrounding the drain.

Document US 2004/038391 (Pyntikov) dated 26 Feb. 2004, discloses a method of enzymatic hydrolysates of proteins of cold water animals, which is performed in a continuous mix and in very precisely controlled conditions until very short aminoacids and proteins are produced. The enzimatic protein hydrolysate disclosed in this document is sterilized and the fish oil and solid particles are eliminated by centrifugation. The enzimatic protein hydrolysate contains up to 90% of free aminoacids, the oil of cold fish, hydroxylapathite (calcium ortophosphate,) proteins, high molecular concentration of aminoacids, vitamins, minerals, and calcium and phosphorous salts. The fabrication process comprises the mixing of waste products of fish with a source of enzymes, comprising innards and entrails of cold-water fish, with a relatively aggressive content of enzymes, effective, even in a lightly alkaline medium. The industrial method provides a higher grade of refinement than existing technologies by using acid and steps of alkaline denaturalization, in combination with separation and advanced drying technologies.

Document FR 2835703 (Linder et al.) dated 15 Aug. 2003, discloses a method for obtaining an oil and a protein hydrolysate from a protein-rich source from marine tissue of discarded filets, fish heads and tails, shellfish or whole fish of low commercial value, comprising enzymatic hydrolysis in no more than 60° C. providing an aqueous mixture comprising hydrolysates and a fat phase including oil, separation of phases, and stopping the hydrolysis in the aqueous phase.

Document U.S. Pat. No. 5,053,234 (Anderson et al.) dated 1 Oct. 1991, discloses a method for the preparation of a protein product from a raw protein source comprising animal parts. The method comprising the following steps: a) reducing the raw material of animal origin in parts in a confined condition; b) hydrolyze the proteins of the confined parts of the raw material of animals using proteolytic enzymes, wherein the hydrolysis is performed at a temperature in a range favorable for enzyme activity without denaturing the protein and for a period of time enough to achieve a predetermined grade of partial hydrolysis of the protein, to form an aqueous solution of parts of animals partially hydrolyzed; c) heat the aqueous suspension, enough to deactivate the proteolytic enzymes and converting fat into oils; d) separation and elimination of non-digestible soluds from the heated aqueous suspension; e) adding oil to the aqueous suspension heating until forming an oily protein suspension; f) pasteurization of the oily protein suspension; g) reduction of the concentration of water in the oily protein suspension to form a oleaginous suspension of partially hydrolyzed protein, and h) elimination of a part of the oil from the oleaginous suspension to form a partially hydrolyzed particulate, of a non-denatured protein product.

According to the previously described, one of the objects of the present invention is to produce wet solutions of peptides (parts of proteins) at a 50% concentration or dry peptides, for human and animal consuption, using as source material secondary products generated in the production of protein food for direct human consumption.

Although the invention is directed to obtaining powder of meat products in general, the invention will be descried based on a simplyfied example, in which a protein food is obtained, wherein the basic steps differentiating the present invention from the state of the art are described.

The procedure is started by a licquefaction of raw material by milling, fat extraction at low temperature previous to the enzymatic action, which at present is distorted by the presence of fat and the enzymatic hydrolysis is combined with the acid hydrolysis, increasing the protein yield to nearly 100%, eliminating organic liquid industrial waste from industrialization.

It is of great importance that the raw material is received in good conservation conditions, in plastic bags and/or in bins isolated with polyurethane and ice cooled. The bins must be stored in an isotermic refrigerated facility.

The industry or plant for development of the process must be installed in a sanitary storehouse, hermetically sealed, with pressure control to maintain a constant small vacuum; the air needed for petroleum combustion in the vapor generating boiler will be obtained from the interior of the storehouse in processes and air evacuating ducts from air drying equipment at low temperature.

The bins and plastic bags are unloaded in a stainless steel hopper, the plastic bags are sent to authorized dumps and the bins are washed with high pressure pumps for re-utilization.

The raw material is milled and pumped to heat exchangers.

The raw material is heated to 50° C. and subjected to centrifugation to decrease efficiently the percentage of fat, which is detrimental to the control of enzymatic hydrolysis.

The produce with lower fat percentage is pumped to digestion tanks of 8 m3, the pH is modified thorugh addition of acid and/or bases, the digestion tanks are heated and with continuous mixing systems, a mixture of proteolytic enzymes is added, the temperature is maintained at 50° C. (+/−3° C.) throughout the process, controlling the pH for higher efficient of hydrolysis for the mixture of enzymes selected.

Once the enzymatic process is completed, the material is pumped to a heat exchanger to increase the temperature to 96° C. and processed in an horizontal centrifuge, tricanter (approximatelly 3,000 revolutions per minute) to extract the remaining oil, separating non-hydrolyzed solids and the liquid with soluble solids and peptides.

The remaining solids of the raw material are chemically hydrolyzed with acid and/or bases, then the process of hydrolysis is neutralized to subsequently concentrate to 50% in a descending film evaporator, producing the acidulated solution at 50%, and/or drying the solution in a spray dryer or an air band dryer at low temperature, milled and stored in impermeable bags of polypropylene ready for sale.

The remaining liquid with soluble solids and peptides is pumped to a heat exchanger to return to 96° C. for the process of fine separation of remaining oil in a vertical separator (approximately at 6,000 revolutions per minute.) The separator discharges fine solids to the screw of solids in the tricanters, continuing the same process of acid hydrolysis described before for solids.

The separator discharges raw oil in a common tank with the oil separated through previous centrifugations, from where is pumped to the storage tank and loaded in trucks for its delivery and/or final processing.

The liquid with solubles is concentrated to a 50% of solids in a vacuum descending film evaporator of various effects made of stainless steel, the acidulated product is stored in tanks for commercialization or further drying.

The 50% concentrate is pumped alternatively to a drum dryer of indirect heating by vapor or hot air spray, or to a heat exchanger, cooling the product to 2° C., to feed an extruder which will allow the feeding of a band dryer, of 3 effects, with air recycling, where the dry solids to a 6% humidity are milled and stored, in polypropylene bags with an impervious film, with 50 kg each, for local sale and or export.

The following products are alternatively produced:

Peptides from enzymatic hydrolysis concentrated to 50%, acidulated.

Peptides from enzymatic hydrolysis, dry to 6% humidity.

Chemical hydrolysate concentrated to 50%, acidulated.

Chemical hydrolysate, dry to 6% humidity.

Peptides from enzymatic hydrolysis, with its fraction of chemical hydrolysate concentrated to 50% acidulated.

Peptides from enzymatic hydrolysis with its fraction of chemical hydrolysate, dry to 6% humidity.

The bags are stored in pallets with 3 height levels.

The air used for drying in a spray dryer and/or band dryer at low temperature with 3 to 12 effects, with a recycling system through an automatic sleeve filter, self-cleaning and a condenser to eliminate humidity generated in the dryer, decreasing a 25% the use of exterior air required; the fake air entering the circuit and a fraction of drying air recycled, after the condenser, will pass through a drop collector and a heater, which will re-heat the air to overcome the saturation point, to subsequently being burned in the burner of the vapor generating boiler for the heaters of the production process.

The equipments of the process tricanter, separator and evaporator are subjected to chemical cleaning daily, the products used are neutralized before sending them to the homogenizing tanks of the liquid industrial waste (LIW) from the factory.

The water used in condensers, from both dryers and evaporator, with 5° C. more than the temperature at which they were supplied from the spring and/or deep well, are used for irrigation and/or are infiltrated back to earth.

The water used in the plant cleaning and distillates from the boiler and evaporator, are homogenized in the LIW tank and are subjected to a physical separation and filtration process before they are destined to irrigation water and/or infiltration together with the water from condensers.

The invention claimed is:

1. A process for production of wet solutions of peptides concentrated to 50% or dry peptides, for human or animal consumption, using as raw material secondary products generated in the production of protein foods for human consumption, wherein the process comprises:
   a) milling the raw material and pumping it to heat exchangers;
   b) heating the milled raw material to 50° C.;
   c) centrifuging the milled and heated raw material to provide a product with a lower fat percentage than the raw material;
   d) pumping the product with a lower fat percentage than the raw material to digestion tanks;
   e) modifying the pH of the product in the digestion tanks by adding an acid and/or base;
   f) heating the digestion tanks comprising the product and adding a mixture of proteolytic enzymes to the digestion tanks, wherein the digestion tanks are heated to a temperature of 47° C. to 53° C.;
   g) pumping the product once the enzymatic process is complete to a heat exchanger to increase the temperature of the digested product to 96° C.;
   h) centrifuging the digested product to extract remaining oil and separate non-hydrolyzed solids and liquid with soluble solids and peptides from the digested product;
   i) chemically hydrolyzing the separated non-hydrolyzed solids by addition of an acid and/or base;
   j) neutralizing chemical hydrolysis of the separated solids; and
   k) concentrating the hydrolyzed separated solids in a descending film evaporator, a spray dryer, or an air band dryer to 50% solids.

2. The process for the production of wet solutions of peptides according to claim 1, wherein in step (f) the mixture of proteolytic enzymes is added to the digestion tanks in a continuous manner.

3. The process for the production of wet solutions of peptides according to claim 1, wherein the process further comprises drying the concentrated solids in a spray dryer or an air band dryer.

4. The process for the production of wet solutions of peptides according to claim 1, wherein the process further comprises separating remaining oil from the liquid with soluble solids and peptides in a vertical separator and then concentrating the liquid in an evaporator to 50% solids.

5. The process according to claim 4, wherein the process further comprises cooling said concentrated liquid to 2° C., drying the cooled concentrated liquid to provide dry solids wherein the solids are dried to 6% humidity, and milling the dry solids.

6. The process for the production of wet solutions of peptides according to claim 5 wherein said concentrated liquid is dried in a band dryer.

* * * * *

UNITED STATES PATENT AND TRADEMARK OFFICE
CERTIFICATE OF CORRECTION

PATENT NO.         : 8,628,817 B2
APPLICATION NO.    : 13/055307
DATED              : January 14, 2014
INVENTOR(S)        : Rodrigo Ramirez Reid et al.

Page 1 of 1

It is certified that error appears in the above-identified patent and that said Letters Patent is hereby corrected as shown below:

In the Specification

Col. 3, line 61: "of 3 effects" should read --from 3 to 12 effects--.

Signed and Sealed this
Third Day of March, 2015

Michelle K. Lee
*Deputy Director of the United States Patent and Trademark Office*